United States Patent

Chisholm et al.

[11] Patent Number: 5,841,353
[45] Date of Patent: Nov. 24, 1998

[54] RELATING TO THE DETERMINATION OF VERTICALITY IN TALL BUILDINGS AND OTHER STRUCTURES

[75] Inventors: Gary Sedman Chisholm; Jason Scott Daly; Michael Anthony Hansby, all of Christchurch, New Zealand

[73] Assignee: Trimble Navigation Limited, Sunnyvale, Calif.

[21] Appl. No.: 691,209

[22] Filed: Aug. 1, 1996

[30] Foreign Application Priority Data

Aug. 16, 1995 [NZ] New Zealand ............................ 272792

[51] Int. Cl.$^6$ ...................................................... G08B 21/00
[52] U.S. Cl. ........................... 340/689; 340/540; 701/213; 33/365; 33/366; 33/533
[58] Field of Search ....................................... 340/540, 689, 340/686, 690; 701/213; 33/366, 365, 533, 551, 227; 342/357; 72/17; 382/106; 364/550, 556; 52/1, 167 DF

[56] References Cited

U.S. PATENT DOCUMENTS

| | | | |
|---|---|---|---|
| 4,434,558 | 3/1984 | Face, Jr. et al. | 33/174 P |
| 4,571,695 | 2/1986 | Elton et al. | 364/550 |
| 4,689,892 | 9/1987 | Kirven | 33/533 |
| 4,718,173 | 1/1988 | Eklund | 33/533 |
| 4,771,549 | 9/1988 | Shelangoskie et al. | 33/533 |
| 4,912,851 | 4/1990 | Rando et al. | 33/227 |
| 4,956,947 | 9/1990 | Middleton | 52/1 |
| 5,012,588 | 5/1991 | Face, III | 33/533 |
| 5,214,947 | 6/1993 | Sissala et al. | 72/17 |
| 5,269,070 | 12/1993 | Thurston | 33/533 |
| 5,512,905 | 4/1996 | Nichols et al. | 342/357 |
| 5,612,679 | 3/1997 | Burgess | 340/689 |
| 5,699,444 | 12/1997 | Palm | 382/106 |

*Primary Examiner*—Thomas J. Mullen, Jr.
*Assistant Examiner*—Benjamin C. Lee
*Attorney, Agent, or Firm*—Blakely, Sokoloff, Taylor & Zafman LLP

[57] ABSTRACT

Determination of the verticality of various structures such as high rise buildings and towers is enabled through various methods involving use of a series of tiltmeter devices, a remote positioning system, or a combination of both. These methods are particularly useful in monitoring deviations from vertical during construction work and adjusting a jumpform. The tiltmeters are typically arranged in a line on the structure and polled to characterise varying tilt states in which displacement of each device increases with height up the structure. The remote positioning measurements are typically made in real time using a satellite based system such as GPS. Departures of a survey point on the jumpform from a vertical target line may be used to monitor verticality during the construction process. These methods may be combined, with tiltmeter measurements being used to monitor growth of a tower structure and calculate an expected position of the jumpform at each stage of construction, and GPS measurements being used to monitor the actual position.

20 Claims, 14 Drawing Sheets

| DELTA RADIUS | DELTA ROTATION |
|---|---|
| 2 cm In | 0 cm R |
| 2 cm In | 1 cm L |
| 1 cm In | 1 cm R |
| 2 cm In | 1 cm R |

Fig. 13

RELATING TO THE DETERMINATION OF VERTICALITY IN TALL BUILDINGS AND OTHER STRUCTURES

FIELD OF THE INVENTION

This invention relates to the verticality of buildings and other structures, and in particular but not solely to methods of monitoring the deviations of high rise buildings and tower structures from vertical during their construction. Adjustments can be made in the construction process once these deviations have been determined.

BACKGROUND OF THE INVENTION

Very tall flexible structures are becoming common in a wide variety of modern architectural and engineering designs. Tower buildings for example, are now found in many large cities and typically house one or more restaurants in their upper levels. Other tall structures include bridge towers, radio masts, and oil rig columns which are manufactured on land.

Structures of this kind are usually designed to flex. Wind loading for example, or thermal expansion of one side or another which is in sunlight, can cause substantial but temporary departures of a structure from verticality. The top of a tower 200 to 300 m tall may be displaced by 10 cm or more horizontally in any direction from its unflexed position directly over the base. It is often desirable to monitor these deviations and particularly during construction work. Tower buildings and similar structures are typically built in discrete vertical stages around 4 m high. Successive stages are created in a jumpform which is jacked upwards at intervals and adjusted in various ways to ensure proper alignment of each stage with the others as the structure grows. The jumpform contains formwork or shuttering into which concrete is poured when a new stage is created and which must be set up in line with concrete already poured in the previous stage. The formwork must often be fixed in place at an appreciable angle from vertical depending on the current state of flex or tilt in the existing structure.

Accurate ongoing determination of the varying deviations from verticality are important to avoid construction of a literally crooked tower. The proper functioning of some services to be installed within the tower walls, and in some cases structural strength of the tower itself, may otherwise be adversely affected. Horizontal displacements of even a few cm which are accidentally built into the path of a lift shaft for example, may require an expensive correction before the building can become operational. The determinations must be made quickly and conveniently with minimal interruption to the pace of modern construction techniques.

Traditional methods of monitoring the verticality of buildings under construction involve use of a zenith optical plummet or an optical theodolite. Both of these devices require trained personnel to carry out measurements under appropriate conditions, and have an accuracy which decreases with height of the building. At least one surveyor must visit the building site each time the structure of a new level is being laid out and the conditions may not be particularly suitable for a measurement at that time. These methods are therefore not regarded as being particularly convenient or accurate for use in the construction of tall towers.

In the first method the zenith optical plummet is located at ground level over a fixed mark, and a laser beam is directed upwards to a bullseye at the new level. Locating the deviation of the beam on the bullseye indicates whether the building is rising sufficiently close to vertical. The method requires two operators and because the beam diverges noticeably at heights greater than about 50 m is of decreasing accuracy as the building rises. The beam is also subject to thermal turbulence and measurements are normally best carried out in the still air of early morning.

In the second traditional method, the theodolite is located some distance from the structure and a telescope sighting is made of the ground level mark and then the bullseye. A minute adjustment of the telescope azimuth is normally required between these two measurements and indicates how far the structure has departed from vertical. This method also suffers from a decrease in accuracy with increasing height, and is inconvenient in that direct lines of sight through the construction area are required.

Modern methods of surveying are able to make use of remote positioning systems which may be satellite or land based. The satellite system most commonly used today is the Global Positioning System (GPS) although others such as the Global Orbiting Navigation System (GLONASS) are also in use or under development. Some land based systems which effectively simulate the satellite based systems for a small area are also under development. Engineering and survey methods which use these systems can be markedly more efficient and accurate than traditional methods such as those described above. An invention using GPS for correct positioning of a construction machine is disclosed in WO 95/19576 for example.

Use of GPS in surveying typically involves a single operator who sets up a base antenna/receiver over a control point having a known position and moves about with a mobile antenna/receiver sometimes called a "GPS total station". The operator places the antenna over unknown survey points in the field to record their position using signals transmitted by a minimum number of satellites which are above the horizon. A vector or baseline is determined from the base site to the mobile unit. Survey points whose position are measured in this fashion may in turn become control points from which measurements of other unknown points may be taken. The use of GPS during a survey procedure may be combined with other techniques such as distance and angle measurements taken with a conventional total station which may be placed at one of the control points.

Each GPS satellite transmits two coded L band carrier signals which enable some compensation for propagation delays through the ionosphere. Each receiver contains an almanac of data on the satellite orbits and uses ephemeris corrections transmitted by the satellites themselves. Satellite-to-antenna distances are deduced from time code or carrier phase differences determined by comparing the received signals with receiver generated signals, and are then used to determine the antenna position by trilateration. Only those satellites which are sufficiently above the horizon can contribute to a position measurement, the accuracy of which depends on various factors including their geometrical arrangement at the time when the distances are determined.

Distances measured from an antenna to four or more satellites enable the antenna position to be calculated with reference to the global ellipsoid WGS-84. Local northing, easting and elevation coordinates can then be determined by applying an appropriate datum transformation and map projection. By using carrier phase differences in any one of several known base/mobile receiver techniques the mobile antenna co-ordinates can be determined to an accuracy in the order of 1 cm. Using Real Time Kinematic (RTK) techniques an operator can obtain position measurements within seconds of placing the antenna on an unknown point. In RTK, satellite correction data is transmitted by radio between the base and mobile receivers during a survey procedure, whether or not there is a line of sight, to ensure in real time that accuracy in the mobile position measurements is maintained and the survey information is correct.

For additional detail on RTK equipment and techniques, see U.S. Pat. No. 5,519,620 issued to Talbot et. al, entitled "Centimeter Accurate Global Positioning System Receiver for On-The-Fly Real-Time Kinematic Measurement and Control". The content of that patent is incorporated herein by reference. For additional detail on GPS, see various texts such as *Global Positioning System Theory and Practice*, Springer-Verlag, 1992, or regular publications such as *Geodetical Info Magazine*, GITC Netherlands, including the Oct. 1993 issue on RTK.

SUMMARY OF THE INVENTION

It is an object of the present invention to provide methods for use when monitoring verticality in tall structures such as high rise buildings and towers, particularly during their construction. It is a further object to provide convenient methods by which adjustments of a jumpform may be determined in order to compensate for deviations of a tall structure from verticality as construction proceeds. These methods are ideally able to be implemented by construction engineers without extensive training in survey techniques.

In a first aspect the invention comprises a method of monitoring verticality using a number of tiltmeter devices placed on the structure. The tiltmeters are placed at known positions along a reference line, usually on an outside surface of the structure.

They are calibrated and measurements of tilt are taken from the devices for processing when required. Tilt states of the structure can then be determined by analysing tilt dependence along the reference line. The measurements may be extrapolated to determine tilt beyond the highest tiltmeter, and thereby deviation from vertical at the point of construction.

In a second aspect, the invention comprises a further method of monitoring deviations from verticality using a remote positioning system such as GPS. A survey observation point is established on the structure, or on a jumpform which is being used in construction. A reference or target line is also established on which the survey observation point will generally lie when the structure is in a state of zero deviation, although the two may be offset. Measurements of the difference in position between co-ordinates of the survey observation point and those of the reference line may then be used to indicate the deviations from vertical. Once again approximate adjustments of the jumpform may be made on the basis of these measurements.

In a third aspect, these two methods may be combined to determine comprehensive adjustments for a jumpform being used in construction of a tower or similar structure. A determination of verticality is made for the tower using the tiltmeter devices. A determination is also made for the jumpform using the remote positioning system. Expected and actual positions for a number of survey points on the jumpform can then be compared and appropriate adjustments can be indicated to workmen on the tower.

The detailed nature of the structure or jumpform is not of particular significance and the methods will be useful in a wide range of circumstances. A simple tower and jumpform are described below by way of example only.

BRIEF DESCRIPTION OF THE DRAWINGS

Preferred embodiments of the invention will be described by way of example with respect to the accompanying schematic drawings, of which:

FIG. 13 is video display of shifts required to bring the survey points in FIG. 11 from their actual to expected positions.

DETAILED DESCRIPTION OF THE PREFERRED EMBODIMENTS

The present invention envisages determinations of verticality in a wide range of tall commercial, residential and industrial structures both during and after their construction. These structures include architecturally designed entities such as high rise and tower buildings in cities, and those which are designed more for purely engineering purposes such as support columns in bridges, and communications masts. Many such structures are hundreds of metres tall and the significant departures from verticality which they may experience, by flexing under varying weather conditions for example, may require monitoring for a number of reasons. During construction work in particular, there is often a need to monitor verticality to ensure that successive stages in the structure are adequately aligned.

Figure 1:
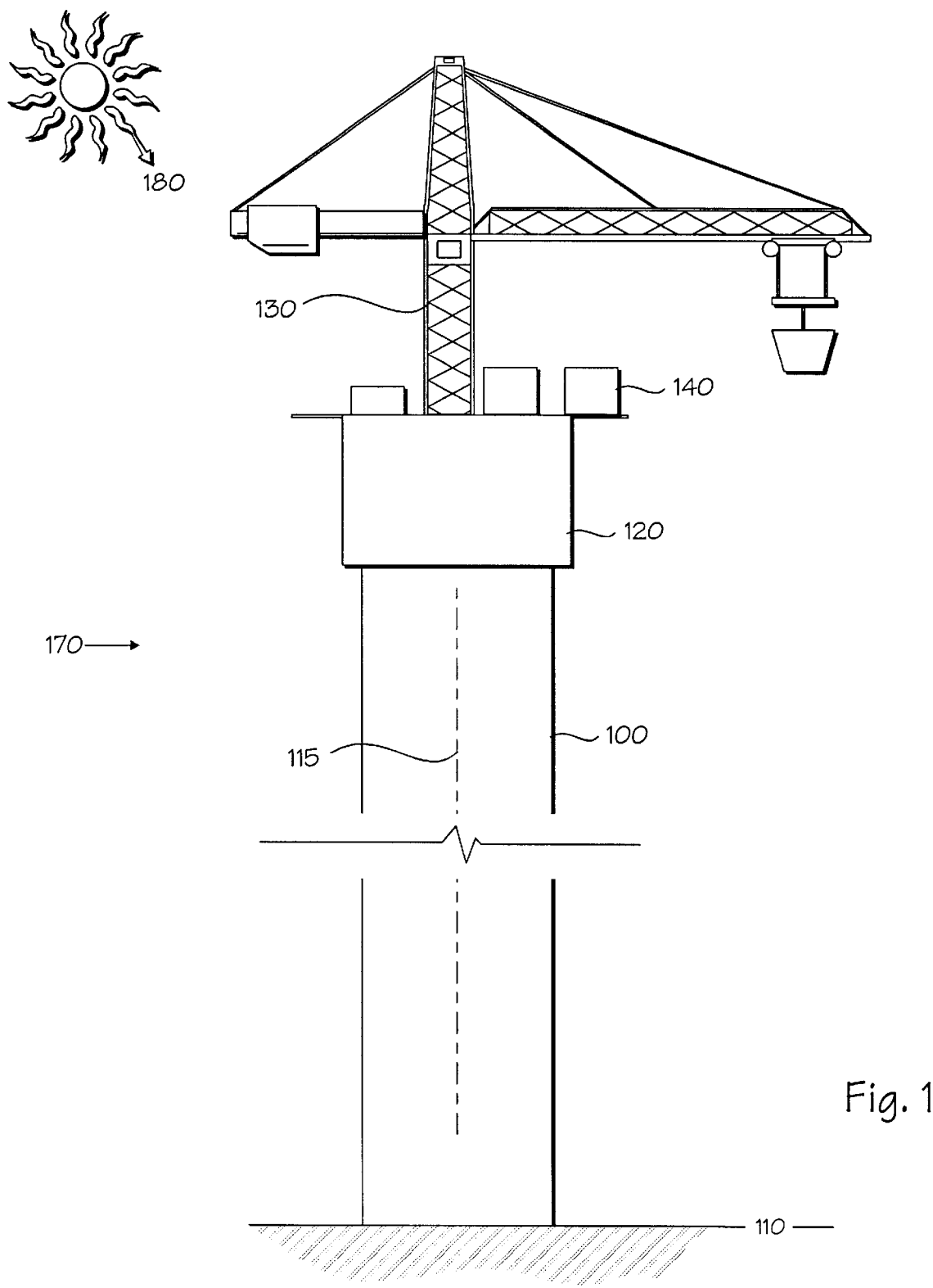
FIG. 1 is a simplified elevational view of a tall structure such as a tower building under construction using a jumpform and crane to produce successively higher stages.

FIG. 1 is a simplified view of a high rising structure 100 such as a tower, being built up from ground level 110 on a construction site. The growing structure is formed in discrete stages which may be simple cylindrical walls 3–4 m high with a diameter of perhaps 20–30 m in the case of a tower, or may represent less regularly shaped floors to be laid out in a more complex building. In this case the structure is a concrete tower which might reach 300 m or more in height and on top of which a restaurant or other commercial premises may eventually be located. The tower has a centerline and axis of cylindrical symmetry 115. Construction takes place by way of a jumpform 120 in which successively higher stages are created as will be described in more detail later. The jumpform is normally a complex system supporting a crane 130 and various facilities 140 such as shelters for workmen, equipment and materials. It is jacked up by an internal mechanism from time to time as each stage is completed at typically weekly intervals. The tower is designed to flex under horizontal forces caused primarily by strong winds 170, and sometimes by sunlight 180 which may heat and expand sunward surfaces of the structure substantially more than those in shade.

Figure 2C:
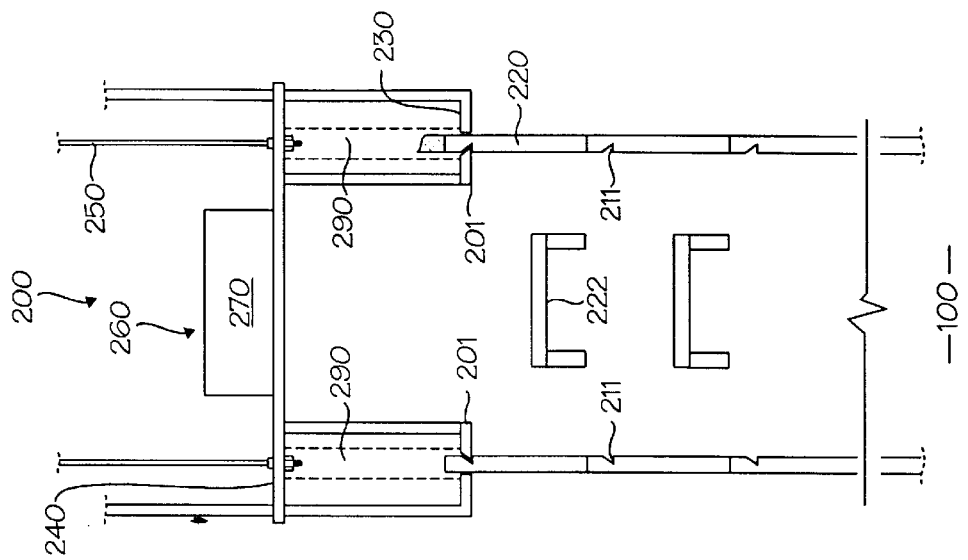
FIGS. 2a, 2b and 2c are vertical cross sections showing how an example jumpform is raised during the construction of two successive stages.
Figure 2B:
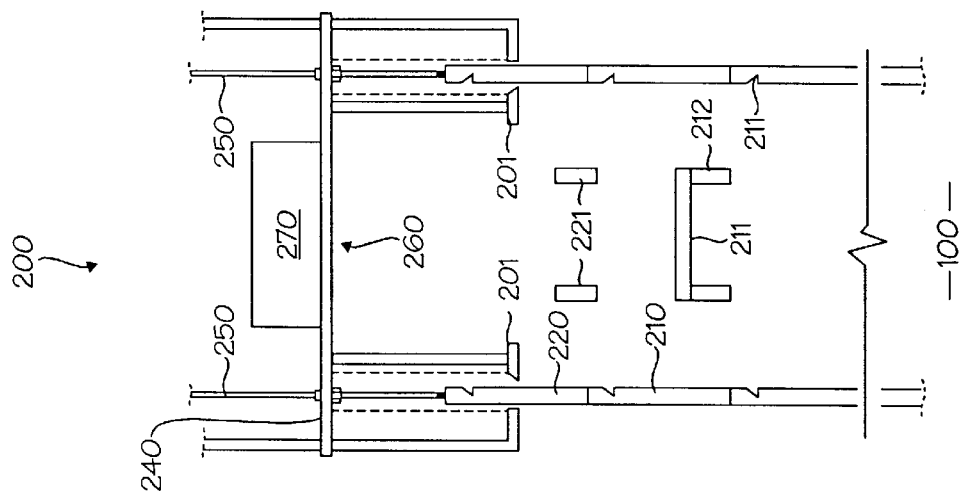
Figure 2A:
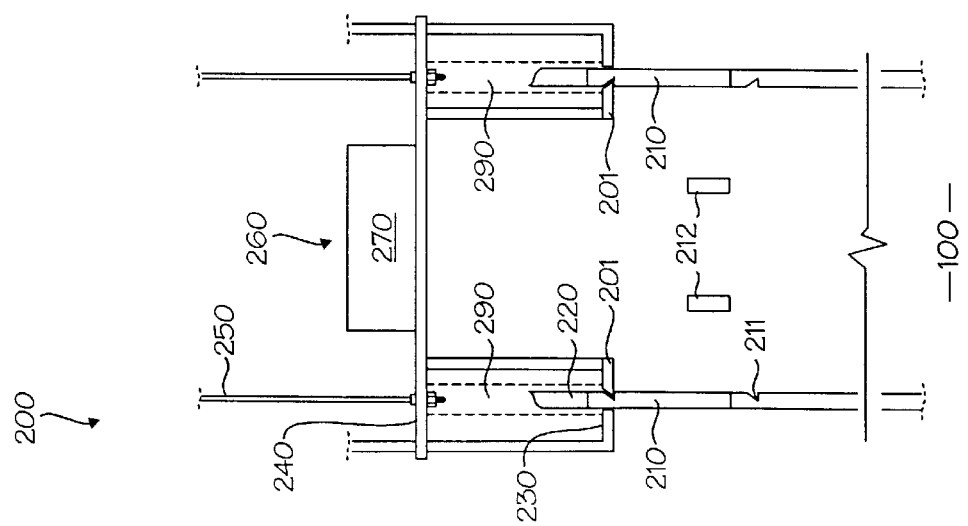

FIGS. 2a, 2b and 2c show an example of the construction process in more detail. Jumpform 200 is jacked upwards during creation of successive stages 210 and 220 at the top of tower 100. This jumpform is shown in a simplified vertical cross section from which various items such as the crane and workmen's facilities have been omitted for clarity. It has lower and upper levels 230 and 240 on which the workmen are able to move around the structure. While the tower will typically have cylindrical walls, the jumpform may take a wide variety of typically polygonal shapes and may appear square or octagonal for example, when viewed from above or below. It is also generally rigid and may be moved upwards as a whole by a ring of hydraulic jacks 250 when required. Many jumpforms are considerably more complex however, and may be composed of numerous moveable parts bolted or otherwise fixed together to be moved and adjusted in a correspondingly complex process. The centre portion 260 of the jumpform is sometimes open above the internal cavity of the tower but is more usually obscured by the base of a crane 270 or other items of equipment and is generally inaccessible.

Jumpform 200 is supported on the tower by feet 201 which engage a series of recesses 211 placed in the tower walls. This means of support is also shown simply as one of several possible examples. Concrete is poured into formwork 290 indicated by dashed outlines within the jumpform. At the instant shown in FIG. 2a, the walls of stage 210 are in place and include recesses which hold feet 201, while pouring is underway for the walls of stage 220. Jacks 250 are inactive and clear of the tower. Stage 210 will be complete when a slab 211 is placed on beams 212. At the instant of FIG. 2b, the latest pour is complete, the concrete of stage 220 has dried and the formwork has been relaxed. Beams 221 have been put in place. Jacks 250 are now driven downwards to meet the tower and raise the jumpform for the next stage. Feet 201 disengage their respective recesses once the jacks are actively supporting the jumpform. At the instant of FIG. 2c this movement has ended. Feet 201 have engaged higher recesses which were included in the walls of stage 220, and the jacks have been withdrawn. The formwork 290 has been set up to receive concrete in the next pour. Stage 220 has been completed by placing slab 222 on beams 221.

Deviations of the tower from vertical should be taken into account when raising jumpform 200 and placing the formwork 290 for a new stage. The formwork must be set up each time so that the new stage is placed on and is aligned with the one immediately below. In FIG. 2a for example, the walls of stage 220 will then grow from those of stage 210 along a common cylindrical axis without a marked interruption in the concrete surface. The alignment is relatively straightforward under ideal conditions when the tower is vertical and the formwork can be placed vertically in line with the existing walls. In general however, a tall tower can deviate or tilt from verticality under varying loading conditions, as mentioned above. Stage 210 could then be tilted from vertical by several degrees at any given moment, and simply placing the formwork for stage 220 to grow vertically as before will create a small kink in the tower. Without sufficient care a series of kinks can be built into the structure and impede the operation of high speed lifts for example. A horizontal displacement of several centimetres in any direction can exist at the top of the tower from moment to moment and be undetectable by eye. A surveyor must therefore normally visit the site each time the jumpform is raised for a new stage of the construction, to determine the direction and magnitude of any current deviation from verticality, and advise on an appropriate adjustment of the formwork.

Figure 3:
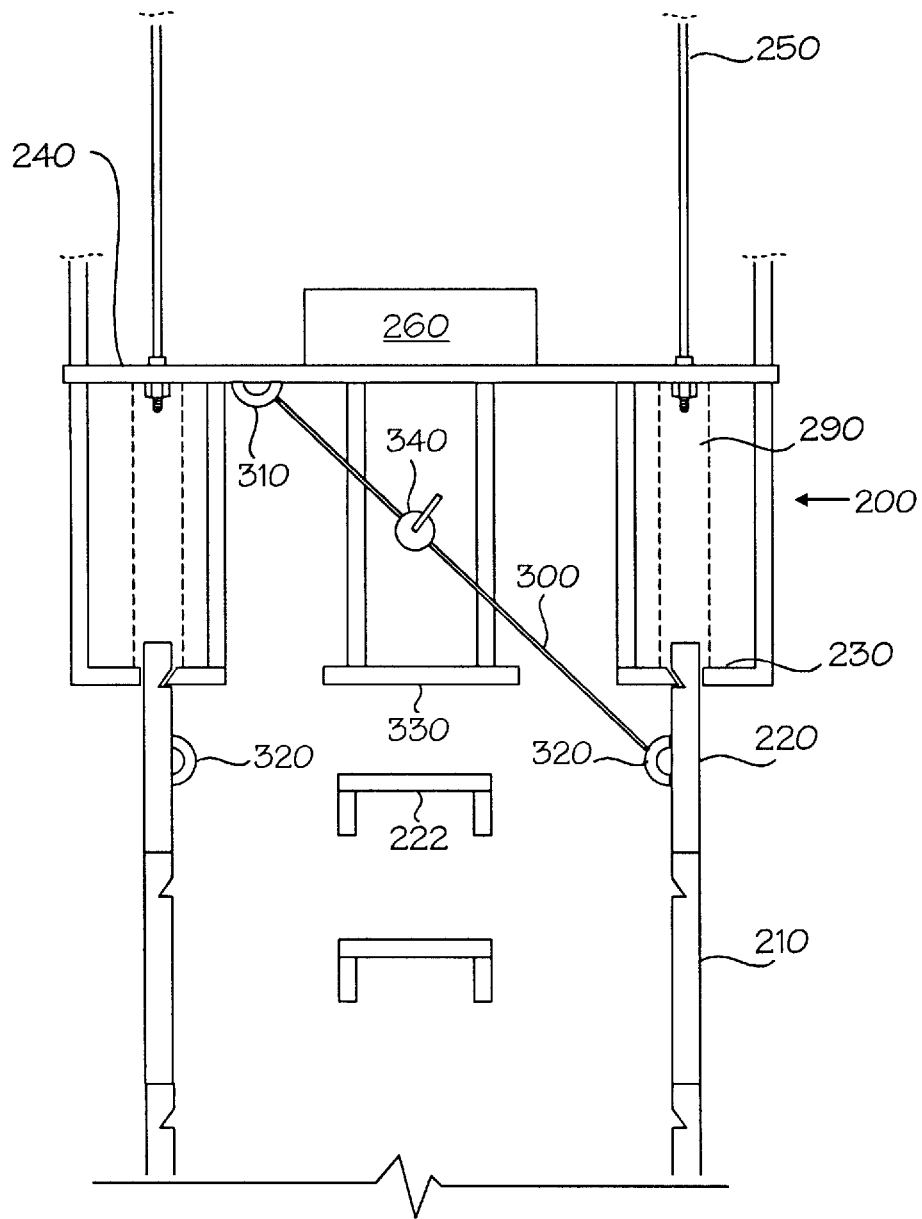
FIG. 3 is an enlargement of FIG. 2c showing how an adjustment of the jumpform is made to compensate temporary deviations from verticality.

FIG. 3 shows a simple system by which the formwork 290 may be adjusted after jumpform 200 has been raised in FIG. 2c. This example assumes that the tower has deviated in a direction to the right on the plane of the page. Both the actual position and required position of the jumpform have been determined. Cable 300 is then drawn between a fixture 310 on the jumpform or possibly the formwork, and a similar fixture 320 which has been built into an inner surface of the wall in stage 220 for this purpose. A workman standing on platform 330, which may be an extension of level 230, operates a winch 340 to tighten the cable. Feet 201 remain engaged in their respective recesses 211 and the top of the jumpform is pulled sufficiently for in the same direction as the existing deviation. Crude adjustments of this kind made immediately prior to each pour of concrete into the formwork are able to reduce kinking of the tower to acceptable levels. In general each stage is built with at least two pairs of opposing fixtures 320 which enable adjustments of the jumpform to compensate any deviation of the tower under most weather conditions. Other techniques of adjusting more complex equipment are also used, including simply nudging the jumpform with the crane in some cases.

Figure 4:
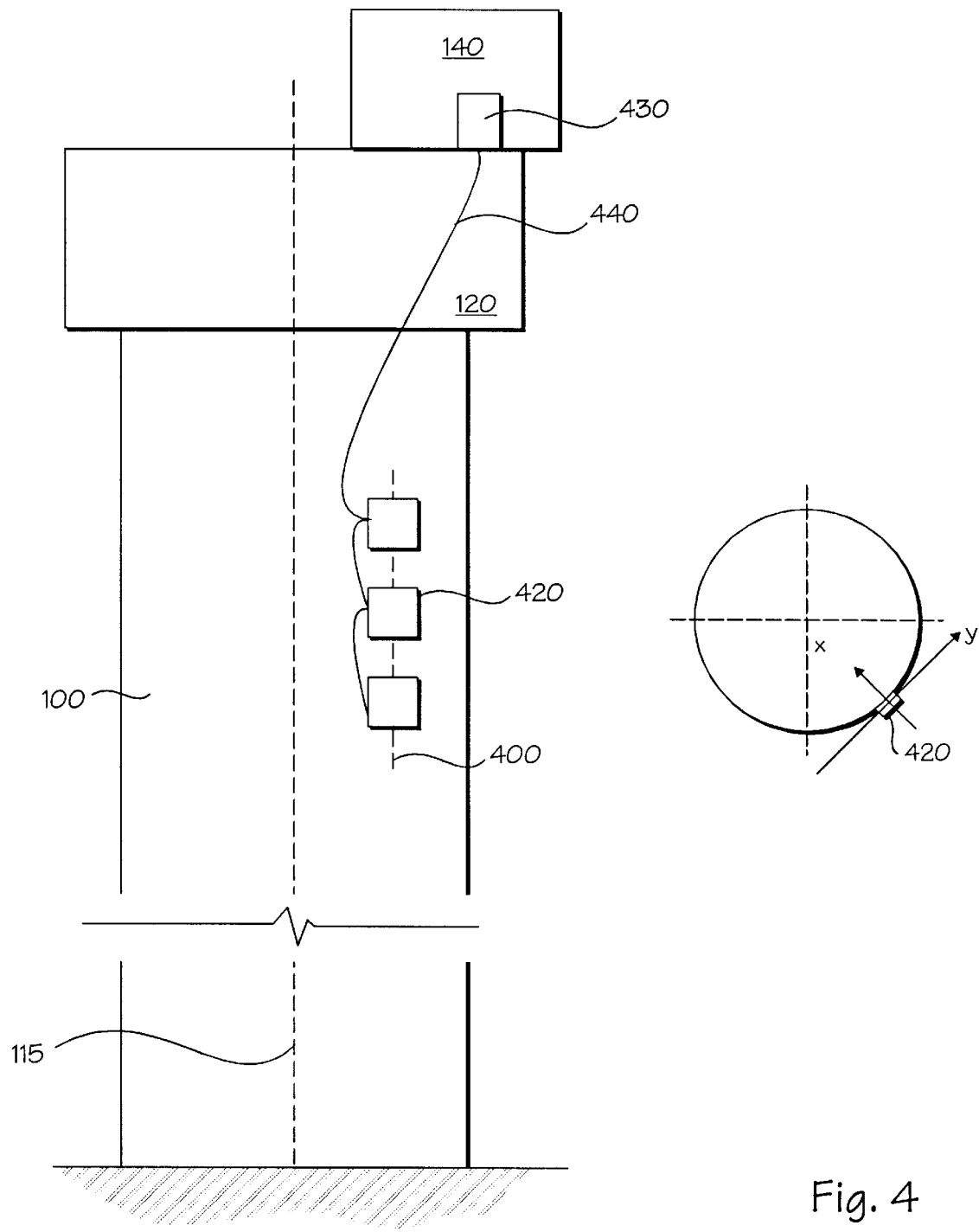
FIG. 4 is a simplified elevational view of the tall building indicating the use of tiltmeters to determine verticality, FIGS. 5a and 5b respectively show an example tiltmeter and a pair of xy tilt vials within the tiltmeter.

FIG. 4 indicates how deviations of the tower 100 from verticality may be determined using tilt detection devices in one embodiment of the invention. These devices may be bidirectional xy tiltmeters of the kind described below. Two or more devices 420, preferably at least three and perhaps up to around ten, are attached to the tower at known heights along a reference line 400. A workman may be lowered by crane to carry out this process when necessary, and the lowermost tiltmeter will normally be removed and reattached in an uppermost position from time to time as the tower grows. The tiltmeters are best placed outside and higher rather than lower on the tower, typically in the top half, to be reasonably near the jumpform 120 for which an extrapolation of the tilt measurements is ultimately required. They need not be placed at equal intervals although a space of at least one construction stage should be allowed between neighbouring devices. They may be electrically connected in series and to a computer processor or datalogger device 430 in shelter 140 on the jumpform. The computer will have customary peripheral devices such as a video screen and printer. An RS 485 connection through cable 440 to a personal computer will be adequate although remote readouts of data from the tiltmeters would also be possible.

Figure 5A:
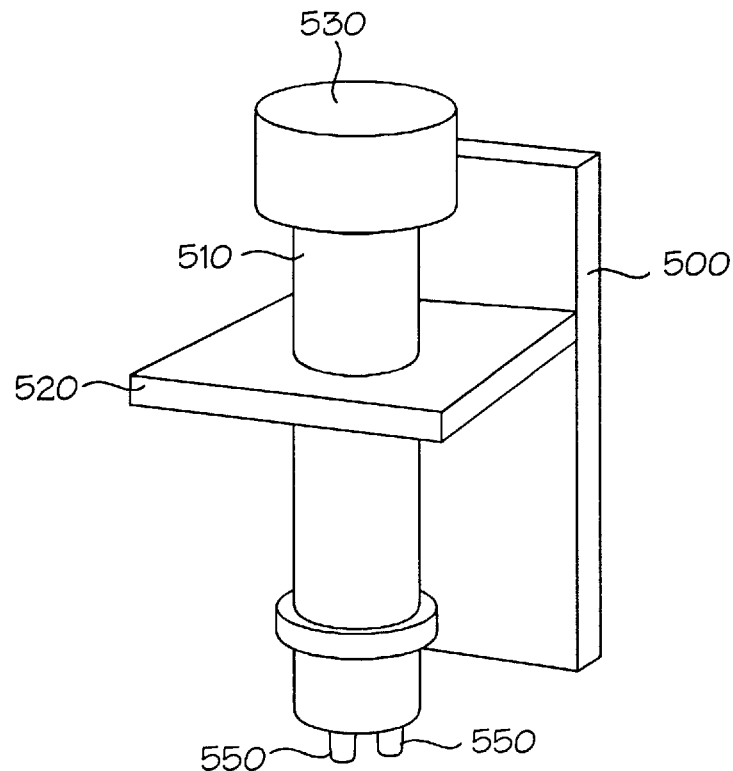
Figure 5B:
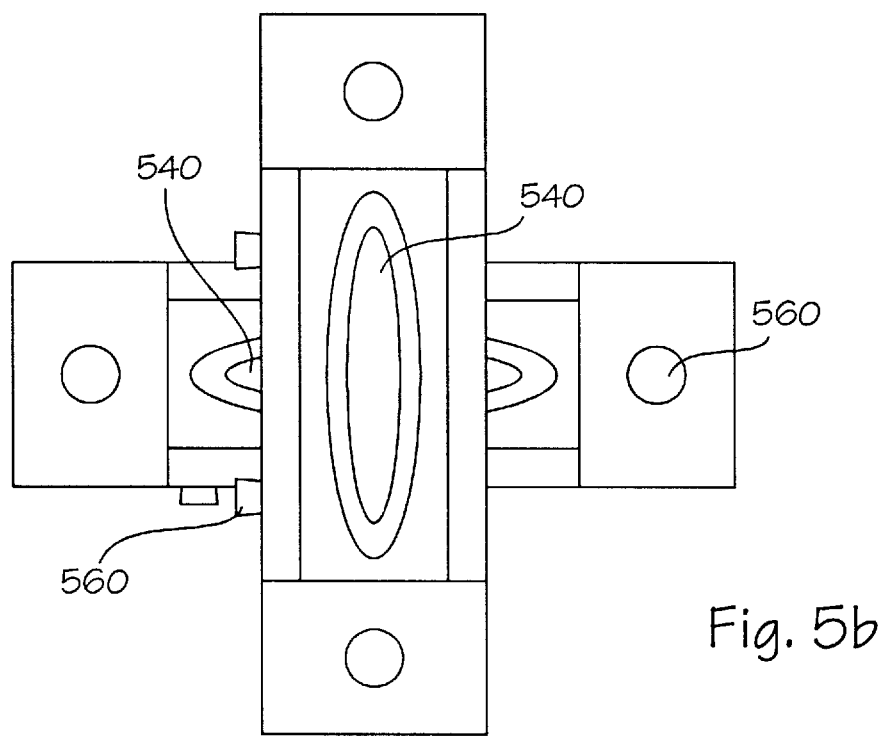

FIGS. 5a and 5b show a typical xy electrolevel tiltmeter which is commercially available. This device includes a plate 500 for attachment to the tower structure and a housing 510 which is fastened to the plate by a bracket 520. The lid 530 of the housing can be removed to reveal two perpendicular vials 540 which lie parallel to the bracket. Liquid in each vial is electrically monitored by circuitry within the housing to produce tilt measurement data through output ports 550. Each tiltmeter must be mounted on the tower in a known orientation, preferably to yield tilt data in horizontal plane as indicated to the right in FIG. 4, and calibrated in a known state of tilt. The vials are preferably oriented to yield Cartesian tilt components which are radial x and tangential y to the tower. Calibration of the tiltmeters will normally take place under calm conditions when the tower and reference line 440 are indeed vertical or nearly so. The vials may be adjusted and locked by screws 560 for manual calibration. Alternatively, calibration may be achieved using the computer by recording the tilt data when the tower is in a state of rest, and applying these tilt values to all subsequent tilt data. Output from these tiltmeters is sometimes affected by vibration from construction activities near the top of the tower and are not normally placed closer than 3 or 4 stages below the jumpform for this reason. It should be noted that the tower 100 is not designed to be rigid and flexes rather than pivots from ground 110. The tilt from vertical at any point on the structure increases nonlinearly with height and is reasonably assumed to be equal at all points in a horizontal plane at that height. Parallel lines on the structure will then follow a common variation of tilt with height, and vertical lines on the outside of the tower for example, will vary identically with the centerline 115. A simple translation of measurements from line 400 to line 115 is readily made for example. A relationship, indicating the horizontal displacement of each point as a function of loading and tower height, is provided by the tower's engineers. This enables tilt data to be extrapolated to the height of the jumpform using tilts obtained from somewhat lower on the tower. Various known data analysis procedures such as least squares regression are alternatively used in this regard. Realistic modelling of an overall tilt state of the tower is complicated by variations in loading with height, and effects caused by the jumpform and the manner in which the tower is anchored to the ground. Regression may be preferred under these circumstances.

Figure 6A:
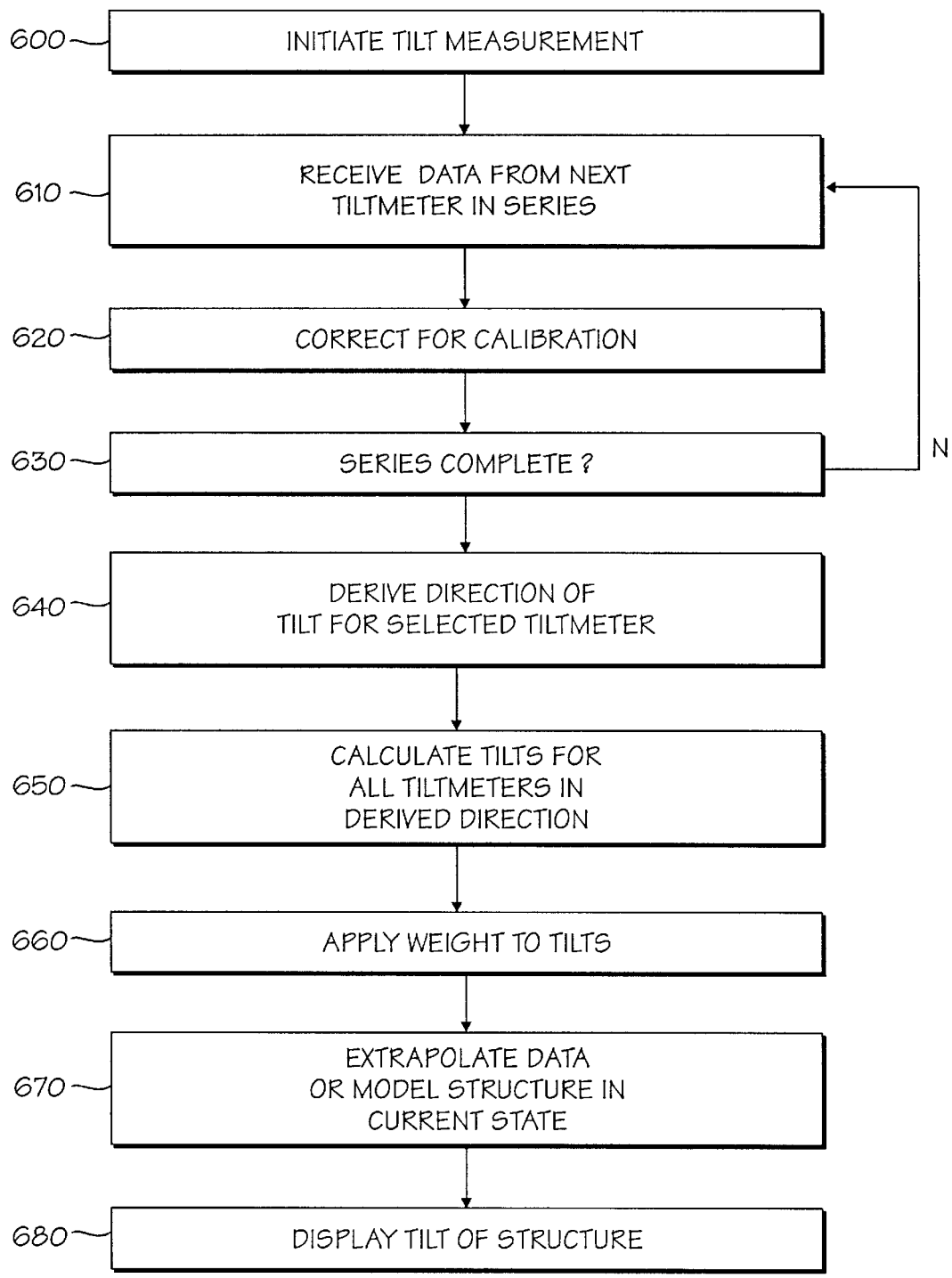
FIG. 6a is a flowchart indicating broadly the steps taken by a computer processor in monitoring and analysing measurements from a series of tiltmeters.

FIG. 6a provides a flowchart setting out a sequence of steps taken by software in the computer processor 430 when monitoring the tiltmeters in FIG. 4 and analysing deviations of the tower from vertical. A measurement cycle is first initiated 600 by an operator working on the tower and the tiltmeters are polled automatically according to a predetermined pattern, normally in sequence down the reference line 400 in series. Each is tested for correct operation before the current xy tilt components are received 610 by the processor and modified 620 by their respective calibration data. Inoperative tiltmeters are ignored but notified to the operator and polling continues until the series is complete 630. The tilt data may be considered as having equal weight but in practice tilt measurements taken higher on the reference line are more accurate. The highest operative tiltmeter is therefore usually selected to provide a base measurement for the others. Tilt direction is derived 640 from the xy components of the selected tiltmeter in preference to simply calculating an average bearing along the reference line. Tilts for all tiltmeters are then calculated 650 in the direction established by this selected bearing and weighted 660 less heavily with decreasing height. The data are then extrapolated 670 according to a model of the tilt state throughout the tower structure, or using a standard technique such as regression. An estimate of tilt at a point determined by intersection of reference line 400 with a plane on the jumpform is then provided 680 for the operator.

Figure 6B:
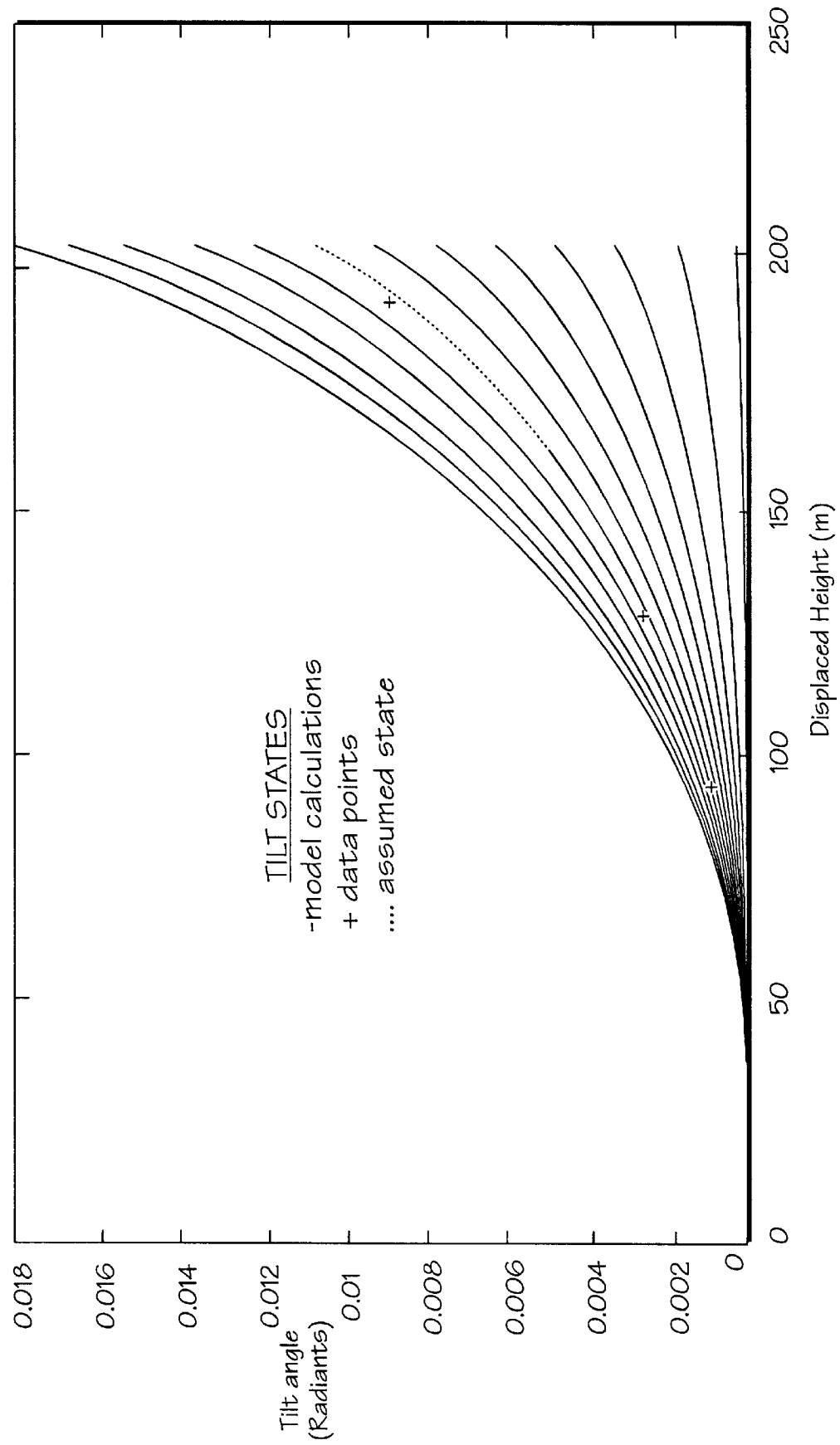
FIG. 6b is graph showing a range of theoretical tilt states for an example tower plotted as tilt angle versus height, and data for a measured tilt state, FIG. 7 indicates a video display which presents a determination of the building from vertical to an operator.

FIG. 6b is a graph showing a range of possible tilt states for an example tall structure under wind loading, according to a theoretical model as mentioned above. A 200 m tower of uniform elastic modulus and uniform load was assumed in each calculated state. The horizontal axis plots height in meters up from ground level, while the ordinate axis plots tilt angle in radians as would be measured by a tiltmeter at each height. Higher placed model curves represent greater loads, or greater elasticity of the structure for a given load. Data points are shown for measurements taken from three tiltmeters positioned at 90, 120 and 180 m having tilt angles of 0.06° (0.0010R), 0.13° (0.0023R) and 0.44° (0.0077R) respectively. These three points fit one of the model curves reasonably closely as indicated by the dotted line, which might alternatively have been determined by regression. If this curve is selected as the state of the tower then the tilt at 200 m is approximately 0.60 (0.0105R). In practice a lookup table may be created and stored in the datalogger device 430. This may have, by way of example, rows which represent 1m intervals up the tower and contain paired height/tilt values for each of say 150 tilt states according to the chosen model. If the model is a realistic representation of the actual tower 100 then the tiltmeter measurements at a point in time should all lie in approximately the same column of the table. The current tilt state of a structure may thereby be characterised by analysing tilt dependence on position along reference line 400.

Figure 7:
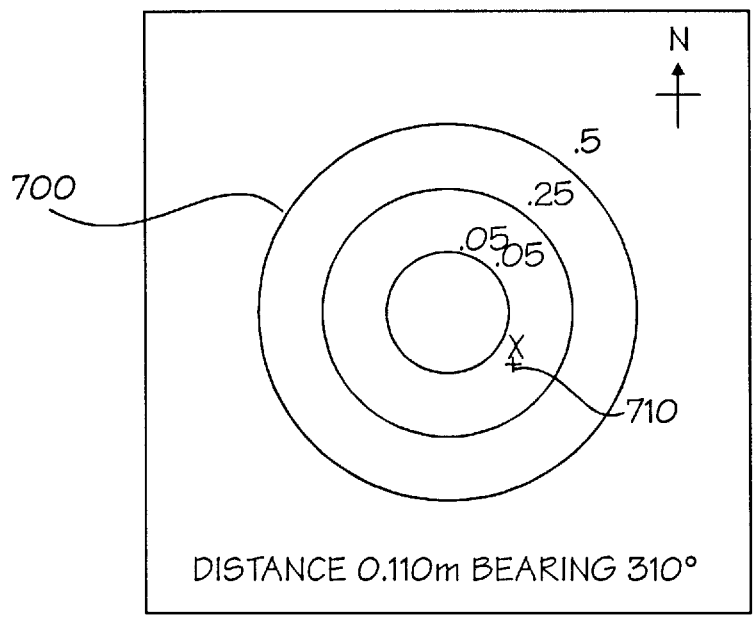

FIG. 7 shows a video display which may be generated for the operator by a personal computer system 430 in FIG. 4. A bullseye presentation 700 indicates graphically and numerically how the reference line 400 has departed from vertical by way of a horizontal displacement at a given level in the tower. The bullseye is typically chosen to lie in a plane on the jumpform, such as defined by level 240 in FIG. 3, under conditions of zero deviation of the tower. Marker 710 then indicates a bearing and distance of the actual deviation, for which the jumpform may be compensated by adjustment using a technique such as described above. The marker appears as a point on centerline 115 of the tower for convenience with the centerline having been deviated in the same manner as reference line 400. This method of determining a current state of verticality or tilt in the tower provides a simple adjustment of the jumpform during construction of a new stage. Although effective in practice the method does assume that the jumpform has been raised directly from the previous stage without error by the workmen. An assumption is made that the jumpform requires no rotation about the centerline of the tower and may be adjusted by a simple radial displacement. A jumpform may well require an adjustment in this regard however, and different components of a complex jumpform may require separate adjustments.

Figure 8A:
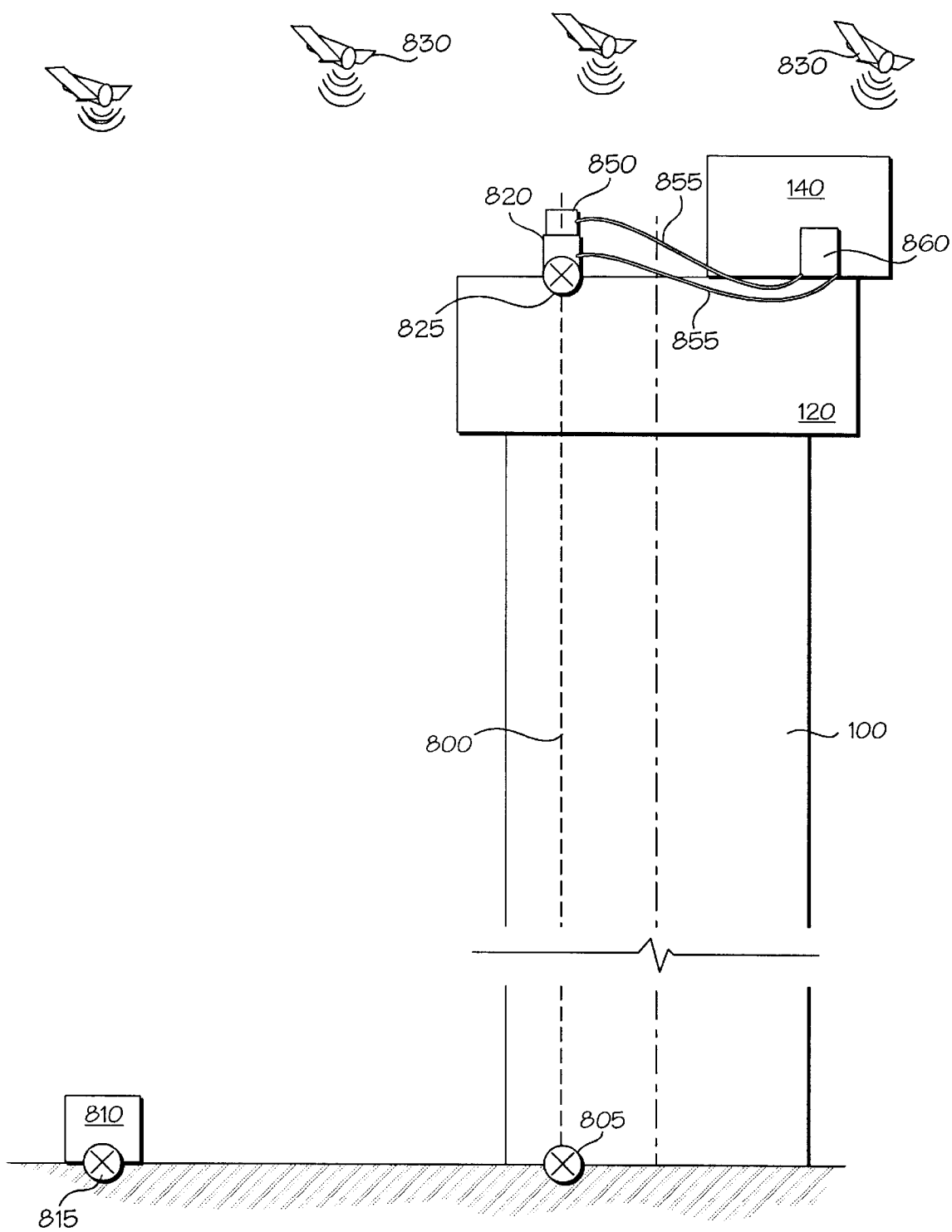
FIG. 8a is a simplified elevational view of the tall building indicating the use of a remote positioning system to determine verticality, FIG. 8b indicates a determination of "vertical" and shows the relationship between various coordinate systems which are typically used in GPS position measurements, FIGS. 9a and 9b respectively show example base and mobile receiver stations which may be used for real time measurements with a satellite positioning system.

FIG. 8a indicates how deviations of the tower 100 from verticality may be determined using a remote positioning system, preferably a satellite positioning system such as GPS, in an alternative embodiment of the invention. A number of satellites 830 in the remote positioning system are shown schematically in the sky above the tower. These enable position measurements to be taken as described above, typically using a real time technique. The tower deviations are determined with respect to a target or reference line 800 which is normally established during the early stages of construction. This line is "vertical" with respect to the geoid which will have a known undulation over the construction site, as shown on FIG. 8b, dependent on any local gravity anomalies. The line is perpendicular to the geoid and passes through an initial reference point, such as point 805 in or near the base of the tower. Departures of a survey observation point 825, which is fixed on jumpform 120, from the target line 800 are then used to monitor the deviations from verticality.

A base receiver station 810 is initially set up at a survey control point 815, for general survey purposes during construction of the tower. The position of this point in the local coordinate system is accurately known from a previous survey procedure, and may be several kilometres away from the site in some cases. A survey observation point 825 is established on the jumpform 120, usually during the early stages of construction when the top of the tower is still close to the ground. Under these conditions the tower is perhaps only a few tens of meters tall and verticality may be assumed. A vertical line through an initial position for point 825 will therefore serve as the target line 800. Alternatively a separate point 805 in the base of the tower may be surveyed for this purpose. In either case there is a relationship between the initial position of point 825 and target line 800, with the point either lying on the line, or having a known offset from the line as a bearing and distance.

A mobile station 820 is set up on the survey observation point 825 from time to time as required during construction of the tower. The mobile station operates in association with the base station 810, typically using RTK techniques as mentioned below, to provide real time measurements of the magnitude and direction of any departures of point 825 from the target line 800. The northing, easting and height co-ordinates of this point in the local grid will vary as the tower grows and flexes under varying loading conditions. Measurements of these departures are interpreted and presented in a suitable fashion for workers or other operators on the construction site. An adjustment of the jumpform, for example, may then be made if necessary to compensate for deviations of the tower from verticality.

Figure 8B:
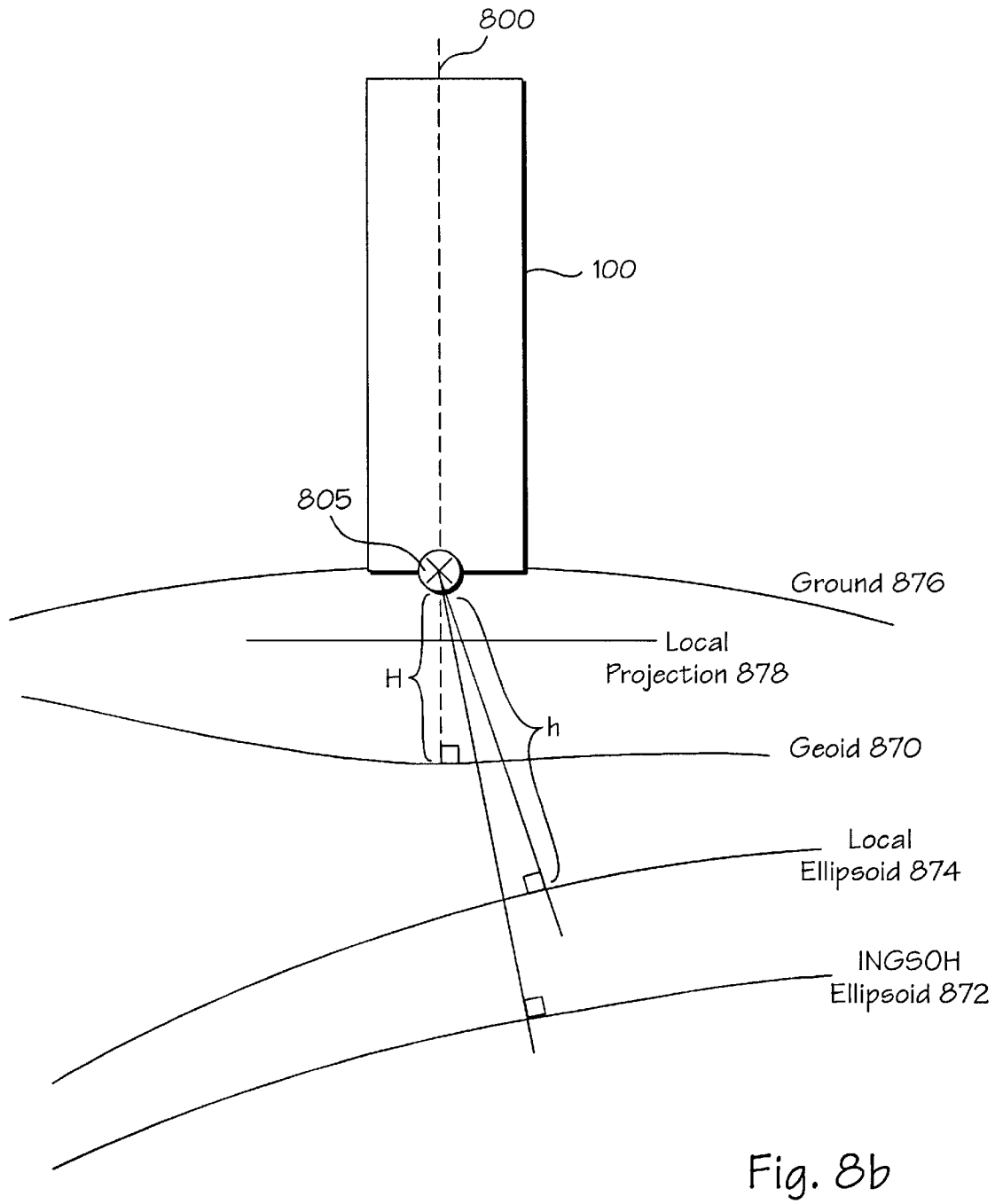

FIG. 8b schematically shows how a vertical reference line 800 may be established in local coordinates using measurements from a remote positioning system such as GPS. A vertical line through any point follows the direction of the earth's gravitational field and runs perpendicular to equipotential surfaces of the field such as the geoid 870, which approximates mean sea level. Satellite based position measurements however, are obtained in terms of a mathematical approximation of the shape of the earth as an ellipsoid 872 called the World Geodetic System 1984 (WGS84). A better approximation to the shape can usually be made over any limited region of the earth, such as a particular continent, by part of a local ellipsoid 874 which has been specifically calculated for that region alone, such as the North American datum 1983 (NAD83). Surveyors usually reference positions on the ground 876 through a local map projection 878 in which ellipsoidal latitude and longitude coordinates are replaced by Cartesian northing and easting coordinates, or through a local map grid in which ellipsoidal heights h are also replaced, by elevation H above the geoid. The WGS84 coordinates of survey point 805 in the base of tower 100 can be determined by the remote positioning system and transformed into coordinates of the local grid automatically by computer survey equipment which is currently available. This point has a perpendicular height H above the geoid along a line which has constant northing and easting coordinates in the grid. This line may be used as the target reference line 800.

Figure 9B:
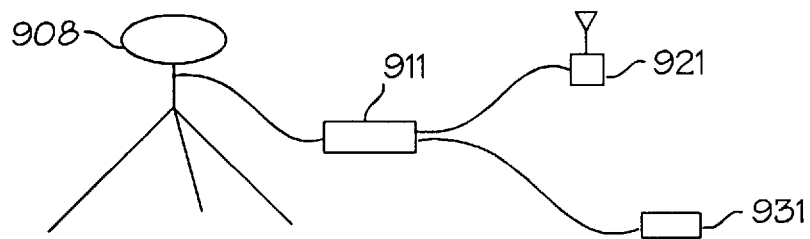
Figure 9A:
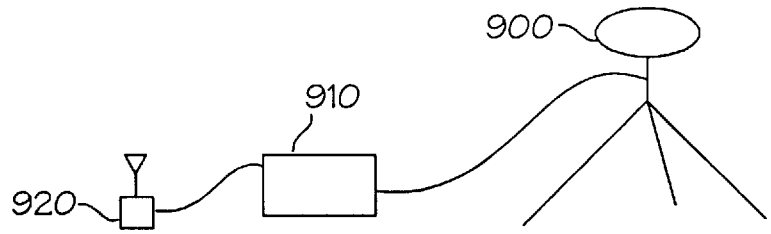

FIGS. 9a and 9b respectively show example base and mobile stations for use in GPS RTK techniques as mentioned above. Each includes an antenna 900, 901 typically mounted on a tripod or similar support, a receiver 910, 911 such as a Trimble 400 series, connected to the antenna, and a radio 920, 921 connected to the respective receiver. The radios may also be mounted on appropriate supports. It is the GPS antenna positions which are measured in the satellite or possibly land based remote positioning system. The phase center of each antenna is placed over the respective survey point and the antenna height is subtracted when determining the position of points such as described in relation to FIG. 8a. For example, the base antenna 900 is placed over point 815 while mobile antenna 901 is placed over point 825.

It is the receivers which determine distances between the satellites and the antenna when calculating position co-ordinates. The radios transmit data between the base and mobile receivers so that the position of the mobile antenna may be accurately and continuously determined with respect to the base antenna in real time using RTK. The mobile station also includes a controller 931 by which an operator is able to interact with the respective receiver and store position measurements. Other computer processing devices may also be connected to the receivers as required. Further details on RTK equipment and procedures may be obtained, by way of example, from U.S. Pat. No. 5,519,620 and other references mentioned above. Although a satellite based positioning system, preferably GPS, and related techniques are herein described, other remote positioning systems, and other, preferably real time techniques, may also be employed.

FIG. 8a also indicates some additional equipment which be used in making more comprehensive measurements of the jumpform as will be described below. A total station 850 may be positioned simultaneously with the mobile antenna 900 over survey observation point 825 which becomes a control point for determination of other survey point positions. These are spread over the jumpform as indicated by way of example in FIG. 11. Modern total stations use EDM (Electronic Distance Measurement) ranging and angular encoders to measure distances and bearings, in this case to each such other point which is accessible at the time the jumpform is to be adjusted. Both the mobile receiver 900 and the total station are able to download their data through cables 855 to a personal computer 860 in shelter 140 for further processing. Computer 430 in FIG. 4 and computer 860 in FIG. 8a will be the same device when both tiltmeter and remote positioning measurements are used to determine deviations from verticality in a given structure, and to comprehensively adjust the jumpform. Computer 860 generates a video display including a bullseye presentation 700 as shown in FIG. 7. In this case however, the bullseye will typically be centred on reference line 800 while marker 710 represents displacement of survey observation point 825. Both a graphical and numerical representation of the deviation from vertical is once again given to an operator.

Figure 10:
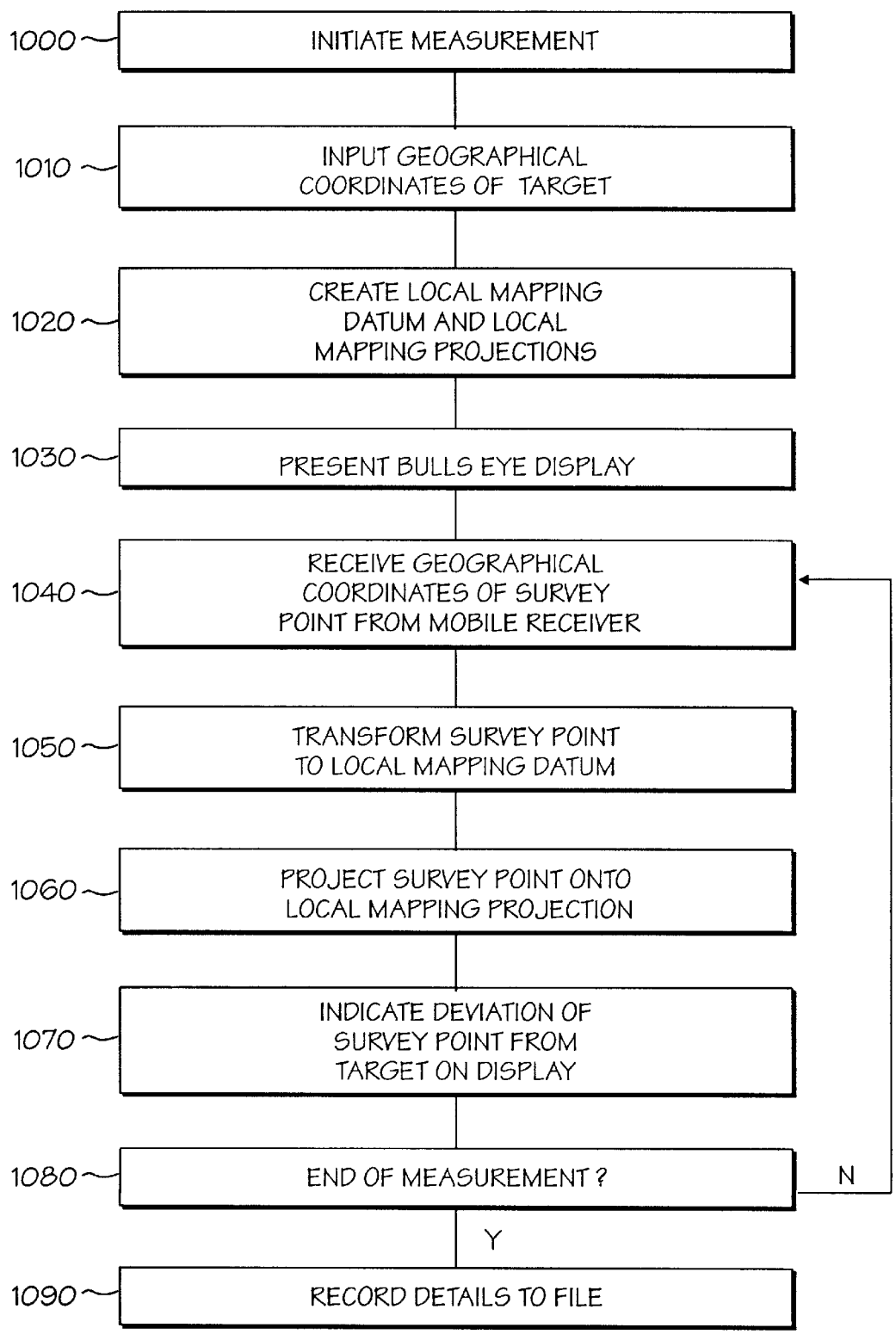
FIG. 10 is a flowchart indicating broadly the steps taken by a computer processor in analysing remote positioning measurements taken at a survey observation point on the jumpform.

FIG. 10 provides a flowchart setting out a sequence of steps taken by software in computer 860 when generating a bullseye presentation of survey observation point 825. A measurement is first initiated 1000 by an operator working on the tower who is then required to input 1010 the local co-ordinates of the target reference line 800. These may already be present in memory. A local datum and desired mapping projection are then created 1020 for subsequent calculations and an initially blank bullseye 700 may be presented 1030 to the operator. The computer then receives 1040 raw position information from the mobile receiver 900 in terms of the global ellipsoid. The information is transformed 1050 to the local datum and projected 1060 to the local mapping projection. Marker 710 can then be placed 1070 on the bullseye to indicate horizontal deviation of the tower from designed location. Both graphical and numerical presentations are made as shown in FIG. 7. Position information is usually received at least once per second from the mobile station and the display is updated with new details as the deviation changes. Eventually the operator terminates the process 1080 and results may be stored 1090 to a file for later analysis if required.

FIGS. 4 and 8 indicate separate methods for determining deviations of the tower from verticality, which although useful in themselves, will not always enable a sufficiently accurate adjustment of the jumpform to be made. The jumpform and tower are separate entities. The deviation of the tower itself, determined by measurements on reference line 400 using the tiltmeters, and the displacement of survey point 825 on the jumpform from reference line 800, determined by measurements using a remote positioning system, are readily combined. Given the tower deviation, an expected position of the survey point 825 on the jumpform can be calculated and compared with its actual position. The jumpform can then be adjusted to bring the survey point into its expected position. This additional possibility of the combined determinations is itself capable of further refinement to provide adjustments of the jumpform not only radially in the direction of tilt or deviation, but also angularly about the centerline 115 of the tower. The refinement becomes possible by establishing further survey points on the jumpform which are measured with respect to point 825 as a control when construction begins.

Figure 11:
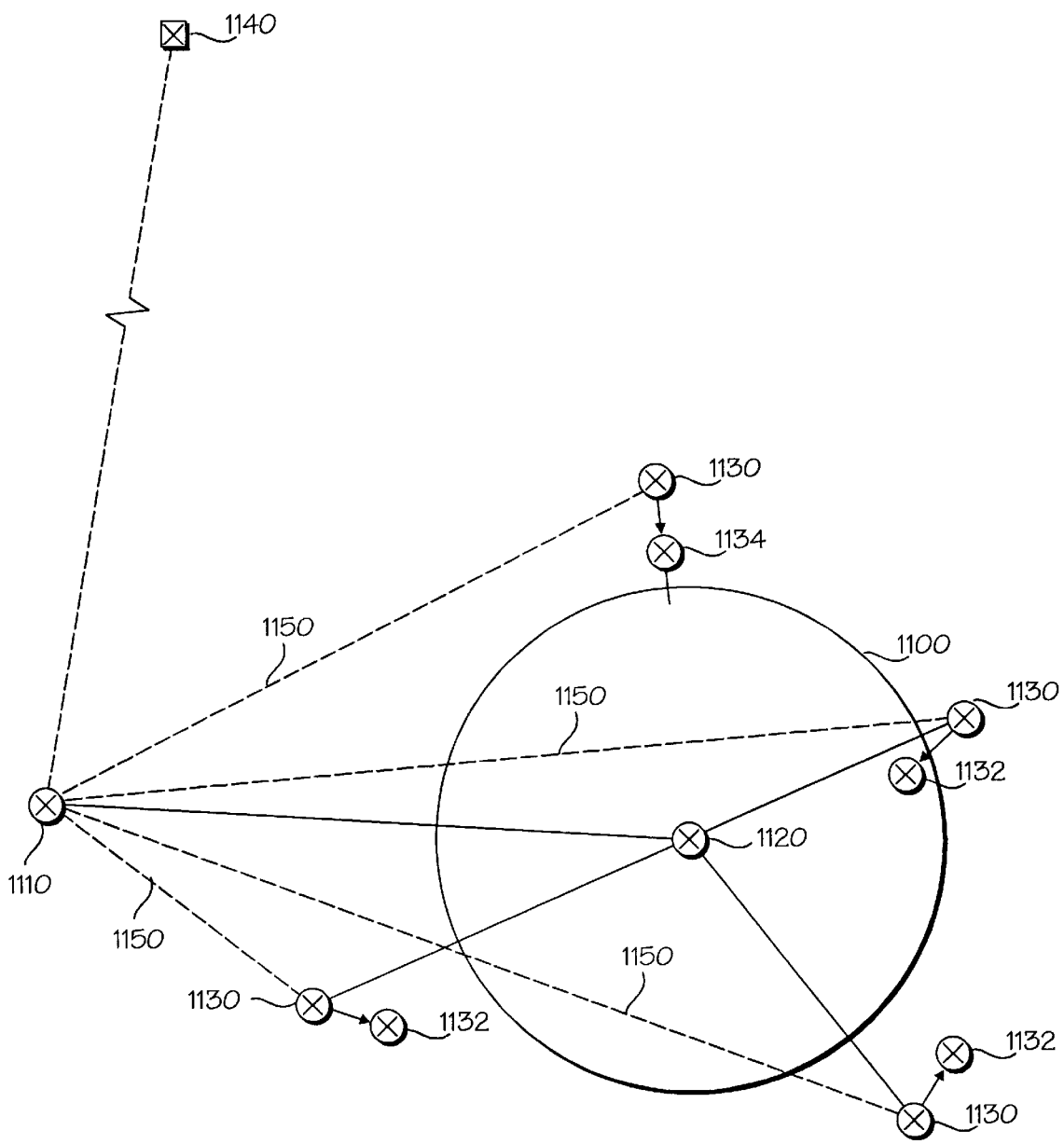
FIG. 11 shows a number of survey points in plan view as they might appear laid out on the jumpform in both their observed and required positions.

FIG. 11 is a schematic plan view of a jumpform 1100 such as that shown in FIGS. 2a, 2b and 2c, indicating various points on or about the tower, and observations which may be made by a workman. The jumpform has just been raised following completion of stage 220 and formwork 290 now needs to be adjusted in compensating for any deviation of the tower from vertical before proceeding to pour concrete for a new stage. The points include a survey observation point 1110 such as point 825 in FIG. 8, a point 1120 on the centre line of the tower or perhaps on reference line 400, and a plurality of other survey points 1130. These are all approximately in a common plane on the jumpform such as at level 240. Several dozen points 1130 should be established on a large complex jumpform anticipating that some will usually be inaccessible due to work in progress at a particular time when the adjustment is to be made. The position of point 1110 is determined using a mobile receiver in a remote positioning system as described in relation to FIG. 8, while that of point 1120 is determined using tiltmeters as described in relation to FIG. 4. The actual positions of survey points 1130 are determined with a total station 850 by taking respective bearings from a distant object 1140 and measuring the dashed line of sight distances 1150. These observations are received from the mobile receiver and total station by computer 860 along cables 855 .

Figure 12:
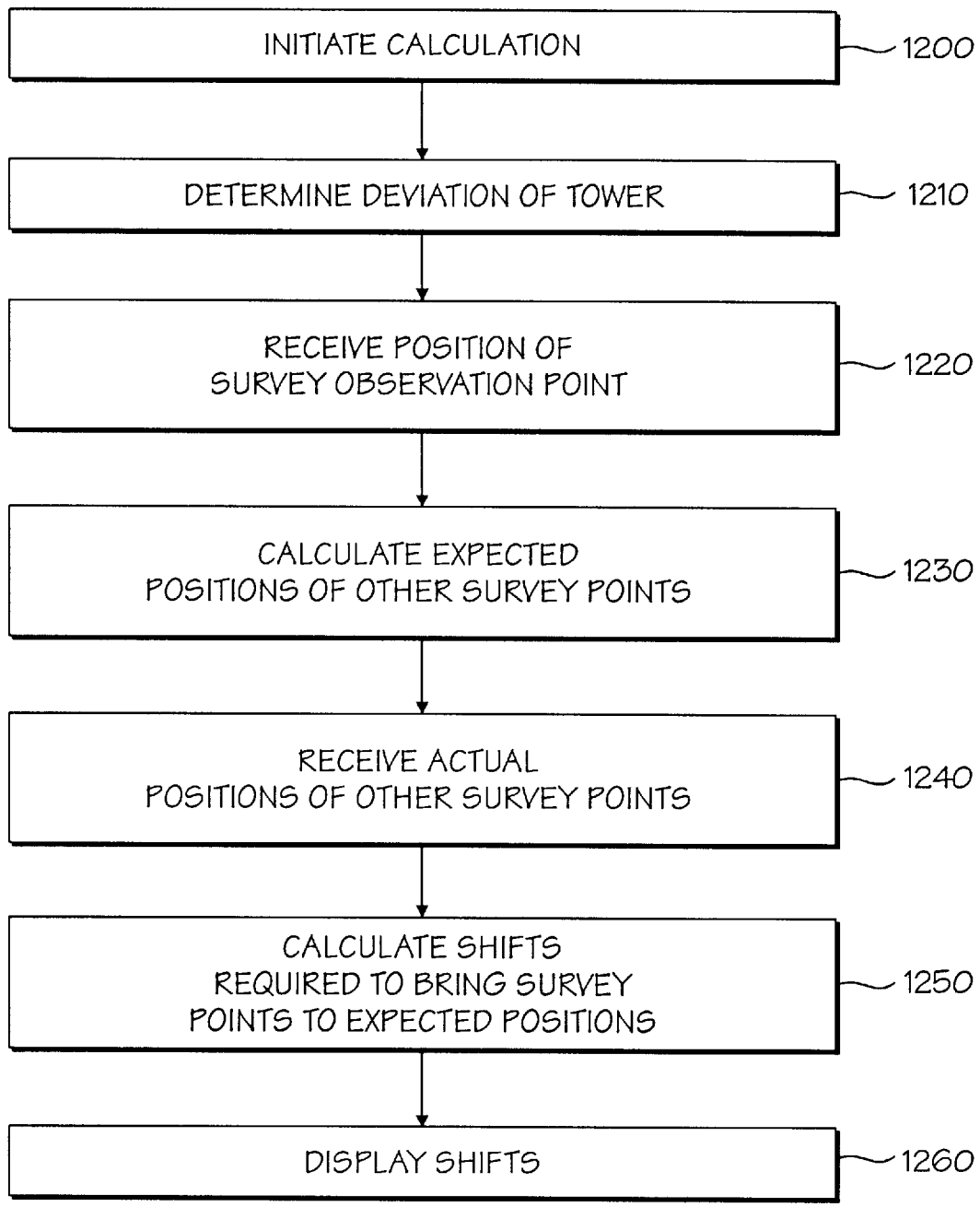
FIG. 12 is a flowchart indicating broadly the steps taken by a computer processor in analysing position measurements of the other survey points on the jumpform to determine an adjustment.

FIG. 12 is a flowchart setting out a sequence of steps which may be taken by software in computer 860 when calculating an adjustment of the jumpform following measurements as described in relation to FIG. 11. The computer ideally contains a database of positions including horizontal co-ordinates of the tower centre line 115 and reference lines 400 and 800, and those of points 1120 and 1130 in their configuration at the commencement of construction. Otherwise these must be entered manually or downloaded from an additional computer. The positions of the tiltmeters and their calibration data will also normally be included. An operator initiates the calculation 1200 and the computer carries out a determination 1210 of tower deviation using the tiltmeters as described above. The actual position of the survey observation point 1110 on the jumpform is received 1220 from the mobile station as also described above. The computer is then able to calculate 1230 the expected positions 1132 of the other survey points 1130 using information from the database. Actual positions for the other survey points 1130 are received 1240 from the total station. The computer is then able to calculate 1250 a comprehensive adjustment of the jumpform which will shift each survey point into or at least closer to its expected position. Finally the various shifts of components in the jumpform which will be required are displayed 1260 for the operator.

FIG. 13 is an example display indicating approximate shifts required to bring the four survey points 1130 in FIG. 11 from their actual positions to expected positions 1132. Various components of a complex jumpform could well require shifts in different directions by different distances of several centimetres or more. This is indicated in FIG. 11 by solid arrows joining the actual and expected positions of each point 1130, none of which are consistent with a uniform displacement of the jumpform. The shifts are conveniently presented to the operator in tabular form comprising a shift toward or away from the tower centre line 115 represented by point 1120, and a rotational shift left or right. Carrying out an adjustment of the jumpform in this case will involve a number of individual processes such as those described in relation to FIG. 3.

It will be appreciated that aspects of the invention may be implemented in a variety of different ways and under a range of different circumstances without departing from the scope of the following claims. A tiltmeter or remote positioning arrangement alone may be appropriate when monitoring construction of a tower using a simple jumpform. They may be more effective used together in some cases. A role of simply monitoring an existing structure may also he required in which case either arrangement could be suitable.

We claim:

1. A method of monitoring tilt in a tall structure, comprising:

placing a plurality of tilt detection devices along a reference line on the structure, calibrating each tilt detection device in a known tilt state of the structure, determining a position for each detection device along the reference line, receiving a tilt measurement from each detection device in a subsequent tilt state of the structure, and characterising the subsequent tilt state by analysing tilt dependence on position along the reference line.

2. A method according to claim 1 further comprising:

calculating a range of tilt states for the tall structure according to a model structure, and selecting from the range of states to characterise the subsequent tilt state.

3. A method according to claim I further comprising:

weighting tilt measurements increasingly with height up the tall structure when analysing the tilt dependence on position.

4. A method according to claim 1 further comprising:
placing the tilt detection devices along a substantially vertical reference line when the structure is in a state of substantially zero tilt.

5. A method according to claim 1 further comprising:
determining a horizontal bearing of the tilt dependence for all of the tilt devices using the tilt measurement from the highest tiltmeter.

6. A method of monitoring deviations of a tall structure from vertical, comprising:
establishing a survey observation point on the structure, having variable coordinates,
establishing a target reference for the structure, having fixed coordinates,
determining current coordinates for the survey observation point using a remote positioning system from time to time, as required, and
determining differences between the current survey point coordinates and the target reference coordinates to provide a measure of the current horizontal deviation.

7. A method according to claim 9 further comprising:
establishing at least one other survey point on the jumpform,
calculating an expected position for at least some of the other survey points,
determining an actual position for the at least some other survey points, and
adjusting the jumpform according to any differences between the actual and expected positions of the survey points.

8. A method according to claim 6 further comprising:
establishing the survey observation point coincidentally with the target reference when the structure is in a state of substantially zero deviation.

9. A method according to claim 6 wherein the structure is under construction and the survey observation point is established on a jumpform which is raised as the structure grows taller.

10. A method according to claim 9 further comprising:
adjusting the jumpform to compensate for the current deviation between stages of the construction.

11. A method of adjusting a jumpform in use during construction of a tall structure, comprising:
establishing a vertical target line for the structure having fixed horizontal coordinates,
establishing a survey observation point on the jumpform having horizontal coordinates which vary as the structure tilts from vertical,
using a remote positioning system to determine the horizontal coordinates of the survey observation point after raising the jumpform to a new construction level, and
adjusting the jumpform to compensate for a deviation of the survey observation point from the target reference due to tilting of the structure.

12. A method according to claim 11 further comprising:
establishing a plurality of other survey points on the jumpform each having an expected position with respect to the survey observation point,
determining actual positions of at least some of the other survey points with respect to the survey observation point after raising the formwork, and
adjusting the formwork according to differences between the actual and expected positions of selected survey points.

13. A method of constructing a tower structure, comprising:
establishing a reference line which deviates from vertical as the structure tilts from time to time during construction,
creating a jumpform with which consecutive higher levels of the structure will be constructed and establishing a plurality of survey points on the jumpform,
raising the jumpform to a current working position and determining a current deviation of the reference line from vertical,
determining displacements of the survey points from their expected positions about the deviated reference line, and
adjusting the jumpform to bring at least some of the displaced survey points into substantially their expected positions before construction proceeds.

14. A method according to claim 13 further comprising:
determining the displacements of the survey points as distances along respective lines to the reference line, or the centre line of the structure, and angular shifts either side of the respective lines to the reference line or the centre line.

15. A method according to claim 13 further comprising:
determining deviation of the reference line using a plurality of tiltmeters arranged on the structure, and
determining the position of at least one survey point using a remote positioning system.

16. A method according to claim 15 further comprising:
determining positions of other survey points as a distance from the one survey observation point and a bearing with respect to a distant reference object.

17. A method of monitoring verticality in a tall structure under construction, wherein successively higher stages of the structure are created using a jumpform, and wherein the positions of survey points are determined using a satellite positioning system, comprising:
setting up a base receiver station at a first survey point, outside the structure, to provide a reference position in a local coordinate system, creating a second survey point, on the jumpform, which will vary in position as the structure grows higher and during weather conditions which cause deviations of the structure from verticality,
using a mobile receiver station which operates in association with the base receiver station, to measure an initial position of the second survey point when the structure is substantially vertical,
establishing a vertical target line in the local coordinate system having horizontal coordinates in a fixed relationship to the coordinates of the initial position of the second survey point,
using the mobile receiver station to measure a subsequent position of the second survey point and thereby to determine a variation of the second survey point from the fixed relationship with the vertical target line,
presenting the variation of the second survey point from the vertical target line to an operator, to indicate a deviation of the structure from verticality.

18. A method according to claim 17 wherein the horizontal coordinates of the vertical target line in the local coordinate system are equal to those of the initial position of the second survey point.

19. A method according to claim 17 wherein the horizontal coordinates of the vertical target line are offset from those of the initial position of the second survey point.

20. A method according to claim 17 wherein the satellite positioning system is the Global Positioning System.

* * * * *

UNITED STATES PATENT AND TRADEMARK OFFICE
CERTIFICATE OF CORRECTION

PATENT NO. : 5,841,353
DATED : November 24, 1998
INVENTOR(S) : Chisholm et al.

Page 1 of 1

It is certified that error appears in the above-identified patent and that said Letters Patent is hereby corrected as shown below:

Column 9,
Line 64, delete "casting" and insert -- easting --

Column 10,
Line 12, delete "400" and insert -- 4000 --

Column 12,
Line 43, delete "he" and insert -- be --
Line 64, delete "I" and insert -- 1 --

Column 13,
Line 6, delete "hearing" and insert -- bearing --
Line 21, delete "claim 9" and insert -- claim 7 --
Line 21, delete "7." and insert -- 9. --
Line 32, delete "8." and insert -- 10. --
Line 36, delete "9." and insert -- 7. --
Line 40, delete "10." and insert -- 8. --
Line 40, delete "claim 9" and insert -- claim 7 --

Column 14,
Line 16, delete "14." and insert -- 16. --
Line 22, delete "15." and insert -- 14. --
Line 27, delete "16." and insert -- 15. --
Line 27, delete "claim 15" and insert -- claim 14 --

Signed and Sealed this

Ninth Day of October, 2001

*Attest:*

NICHOLAS P. GODICI
*Attesting Officer*     Acting Director of the United States Patent and Trademark Office